United States Patent
Lesperance

(10) Patent No.: US 12,419,396 B2
(45) Date of Patent: Sep. 23, 2025

(54) LUGGAGE WITH CONTAINER RECEPTACLES

(71) Applicant: Jeffery Baron Lesperance, Howell, MI (US)

(72) Inventor: Jeffery Baron Lesperance, Howell, MI (US)

( * ) Notice: Subject to any disclaimer, the term of this patent is extended or adjusted under 35 U.S.C. 154(b) by 0 days.

(21) Appl. No.: 17/712,337

(22) Filed: Apr. 4, 2022

(65) Prior Publication Data

US 2022/0322798 A1    Oct. 13, 2022

Related U.S. Application Data

(60) Provisional application No. 63/170,429, filed on Apr. 2, 2021.

(51) Int. Cl.
| | |
|---|---|
| A45C 5/14 | (2006.01) |
| A45C 11/00 | (2006.01) |
| A45C 13/00 | (2006.01) |
| H02J 50/10 | (2016.01) |

(52) U.S. Cl.
CPC ............. *A45C 5/14* (2013.01); *A45C 13/008* (2013.01); *H02J 50/10* (2016.02); *A45C 2005/142* (2013.01); *A45C 11/001* (2025.01); *A45C 11/002* (2025.01); *A45C 11/003* (2025.01); *A45C 2200/20* (2013.01)

(58) Field of Classification Search
CPC ............. A45C 5/14; A45C 2011/001; A45C 2011/002; A45C 2200/20
See application file for complete search history.

(56) References Cited

U.S. PATENT DOCUMENTS

| | | | | |
|---|---|---|---|---|
| 6,116,045 A | * | 9/2000 | Hodosh | F25D 3/08 |
| | | | | 62/457.7 |
| 6,609,599 B1 | * | 8/2003 | Chang | A45C 13/262 |
| | | | | 190/102 |
| 8,485,327 B1 | * | 7/2013 | Dalrymple | A45C 9/00 |
| | | | | 190/110 |
| D712,142 S | * | 9/2014 | Bayley | D3/279 |
| 9,365,146 B1 | * | 6/2016 | Allen | B60N 3/104 |
| 9,609,100 B2 | * | 3/2017 | Litterello | H04M 1/04 |

(Continued)

FOREIGN PATENT DOCUMENTS

| | | | | |
|---|---|---|---|---|
| KR | 20090049217 A | * | 5/2009 | B60N 3/108 |

OTHER PUBLICATIONS

Scosche: Cup Holder Phone Mount Adapter: https://www.scosche.com/cup-holder-mount-base-for-mobile-devices (Year: 2021).*

(Continued)

*Primary Examiner* — Nathan J Jenness
*Assistant Examiner* — Justin Caudill
(74) *Attorney, Agent, or Firm* — The Patent Baron PLLC

(57) ABSTRACT

The disclosure provides an article of luggage including one or more receptacles. The receptacles may receive beverage containers, food and food containers, or mobile devices. The receptacles may be integrated into the luggage or selectively removable from the luggage. Blank plugs may be inserted into the receptacle openings and secured via a latch mechanism. The receptacles may also be secured with the latch mechanism. Seals are provided to prevent water, dirt, or debris from entering the luggage and securing the contents of the luggage.

3 Claims, 6 Drawing Sheets

(56) References Cited

U.S. PATENT DOCUMENTS

| | | | | |
|---|---|---|---|---|
| 10,111,507 | B2* | 10/2018 | Daly | A45C 5/14 |
| 10,287,055 | B2* | 5/2019 | Barattin | A45C 13/005 |
| D873,001 | S * | 1/2020 | Alvarez | D3/274 |
| 2014/0041558 | A1* | 2/2014 | Lubotta | E05G 1/08 |
| | | | | 109/23 |
| 2014/0238800 | A1* | 8/2014 | Nebeling | A45C 13/00 |
| | | | | 190/102 |
| 2016/0242517 | A1* | 8/2016 | Nebeling | A45C 5/14 |
| 2017/0127783 | A1* | 5/2017 | Korey | H02J 7/0068 |
| 2017/0234596 | A1* | 8/2017 | Patsis | H04R 1/028 |
| | | | | 220/592.2 |
| 2018/0154815 | A1* | 6/2018 | Karges | B60N 3/103 |
| 2019/0045897 | A1* | 2/2019 | Bhatnagar | H01M 50/247 |
| 2019/0168653 | A1* | 6/2019 | Dyle Kim | B60N 3/108 |
| 2019/0214839 | A1* | 7/2019 | Goldner | H02J 7/007 |
| 2020/0361355 | A1* | 11/2020 | Chen | B60N 3/103 |

OTHER PUBLICATIONS

Scosche: Cup Holder Phone Mount Adapter Data Sheet (Year: 2020).*

Maso Cupholder Charger: (https://www.amazon.com/MASO-Wireless-Charger-Charging-Android/dp/B07HHVSP9Z) (Year: 2018).*

* cited by examiner

LUGGAGE WITH CONTAINER RECEPTACLES

CROSS-REFERENCE TO RELATED APPLICATIONS

This application claims priority benefit of U.S. Provisional Application No. 63/162,648 filed on Apr. 2, 2021, the entire contents and disclosures of which are incorporated herein by reference.

BACKGROUND

1. Field of the Disclosure

This disclosure is directed to luggage and other devices for carrying cargo. The disclosure is also directed to luggage with selectively removable receptacles.

2. Description of the Background

Luggage or other devices are often used to carry personal effects, such as clothing, toiletries, electronics, reading materials, and the like. In many instances, luggage is used when traveling, such as on an airliner or train. In those situations, and others, it is typical that there are many other people traveling at the same time, in the same area. As a result, space is at a premium.

For example, a typical airport waiting lounge or boarding area includes a number of seats but not many tables or surfaces where a traveler may place food, drinks, or portable electronic devices (e.g., mobile phones, tablet or laptop computers). As a result, often travelers are forced to place these items in unwanted or uncomfortable positions. These positions include their laps, under their seat, or the floor next to them, or in an adjacent seat (if available).

None of these options are particularly appealing. If the lap is used, food or drink may cause stains or other damage to clothing. The floor of an airport is not likely to be the cleanest area to place a personal item. Likewise, an adjacent seat that has been occupied by other travelers is less appealing the more it is considered.

The traveler's luggage presents a different solution, yet most luggage is not equipped to provide appropriate storage for food, drink, or personal electronic devices (or other objects). Typically, luggage is either soft sided—providing an unstable surface for these items—or it is hard-sided—providing a smooth surface unlikely to keep an object in one place for long, especially if the luggage is placed on the lap of the traveler, or on the floor nearby. What is needed then is luggage with integrated receptacle for food, drink, and personal electronic devices that securely stores these objects safely and in positions that benefit the traveler.

SUMMARY

The present disclosure overcomes the problems and disadvantages associated with current strategies and designs and provides new tools and methods for luggage with receptacles.

One embodiment of the disclosure is directed to an article of luggage ("luggage") with at least one selectively removable receptacle (i.e., cupholder) and/or at least one integrated receptacle.

Another embodiment of the disclosure is directed to luggage with at least one receptacle that accepts a beverage container, such as a cup, bottle, or glass.

Another embodiment of the disclosure is directed to luggage with at least one receptacle that accepts a personal electronic device.

Another embodiment of the disclosure is directed to luggage with at least one receptacle that accepts a beverage container that includes a handle, such as a coffee mug.

Another embodiment of the disclosure is directed to luggage with at least one receptacle that provides a flat surface for receiving at least one object.

Another embodiment of the disclosure is directed to luggage with at least one receptacle that is removable.

Another embodiment of the disclosure is directed to luggage with at least one receptacle that is removable and replaceable with a plug providing a smooth exterior surface.

Another embodiment of the disclosure is directed to luggage with at least one receptacle that is removable and replaceable with a plug providing a seal and locking mechanism.

Another embodiment of the disclosure is directed to luggage including a first portion, the first portion defining a first interior surface and a first exterior surface, a second portion, the second portion defining a second interior surface and a second exterior surface, wherein the second portion couples to the first portion to define a volume; the first portion includes at least one of a handle and a cupholder; and the second portion includes at least one cupholder.

Another embodiment of the disclosure is directed to luggage including at least one of the first portion and the second portion includes a slot configured to receive a mobile device.

Another embodiment of the disclosure is directed to luggage including where the slot of the second portion is disposed between a first cupholder and a second cupholder of the second portion.

Another embodiment of the disclosure is directed to luggage including where the at least one cupholder of the first portion and the second portion includes at least one of a gripping element and a frictional surface configured to selectively engage an object placed within the at least one cupholder.

Another embodiment of the disclosure is directed to luggage including where the at least one cupholder of the first portion and the second portion includes at least one of a wireless charging device and a wired charging device.

Another embodiment of the disclosure is directed to luggage including where the slot includes at least one of a wireless charging device and a wired charging device.

Another embodiment of the disclosure is directed to luggage including a power supply, where the power supply is at least one of a battery, a solar panel, a fuel cell, and a connection to a power grid.

Another embodiment of the disclosure is directed to luggage including a selectively removable plug to replace a cupholder, the plug including a latching element and a sealing element.

Another embodiment of the disclosure is directed to luggage including a first portion, the first portion defining a first interior surface and a first exterior surface, a second portion, the second portion defining a second interior surface and a second exterior surface, wherein the second portion is selectively attached by a mechanical device to the first portion to define a volume; where the first portion includes at least one of a handle and a cupholder; where the second portion includes at least one cupholder.

Another embodiment of the disclosure is directed to luggage including where at least one of the first portion and the second portion includes at least one of a tray and a slot.

Another embodiment of the disclosure is directed to luggage including where at least one of the cupholder, the tray, and the slot includes at least one of a gripping element and a frictional surface configured to selectively engage an object placed within the cupholder.

Another embodiment of the disclosure is directed to luggage including where at least one of the cupholder, the slot, and the tray includes at least one of a wireless charging device and a wired charging device.

Another embodiment of the disclosure is directed to luggage including a power supply, wherein the power supply is at least one of a battery, a solar panel, a fuel cell, and a connection to a power grid.

Another embodiment of the disclosure is directed to luggage including a selectively removable plug to replace a cupholder, the plug including a latching element and a sealing element.

Another embodiment of the disclosure is directed to luggage including a first portion, the first portion defining a first interior surface and a first exterior surface, a second portion, the second portion defining a second interior surface and a second exterior surface, where the second portion is selectively attached by a mechanical device to the first portion to define a volume; where the first portion includes a wheel and a handle; where the second portion includes a wheel and a cupholder.

Another embodiment of the disclosure is directed to luggage including where the second portion includes a tray disposed between the first cupholder and a second cupholder.

Another embodiment of the disclosure is directed to luggage including where the at least one cupholder of the first portion and the second portion includes at least one of a at least one of a gripping element and a frictional element configured to selectively engage an object placed within the cupholder.

Another embodiment of the disclosure is directed to luggage including where at least one of the cupholder and the slot includes at least one of a wireless charging device and a wired charging device.

Another embodiment of the disclosure is directed to luggage including a power supply, wherein the power supply is at least one of a battery, a solar panel, a fuel cell, and a connection to a power grid.

Another embodiment of the disclosure is directed to luggage including a selectively removable plug to replace a cupholder, the plug including a latching element and a sealing element.

Other embodiments and advantages of the disclosure are set forth in part in the description, which follows, and in part, may be obvious from this description, or may be learned from the practice of the disclosure.

DESCRIPTION OF THE FIGURES

The disclosure is described in greater detail by way of example only and with reference to the attached drawings, in which.

DESCRIPTION OF THE DISCLOSURE

Figure 1:
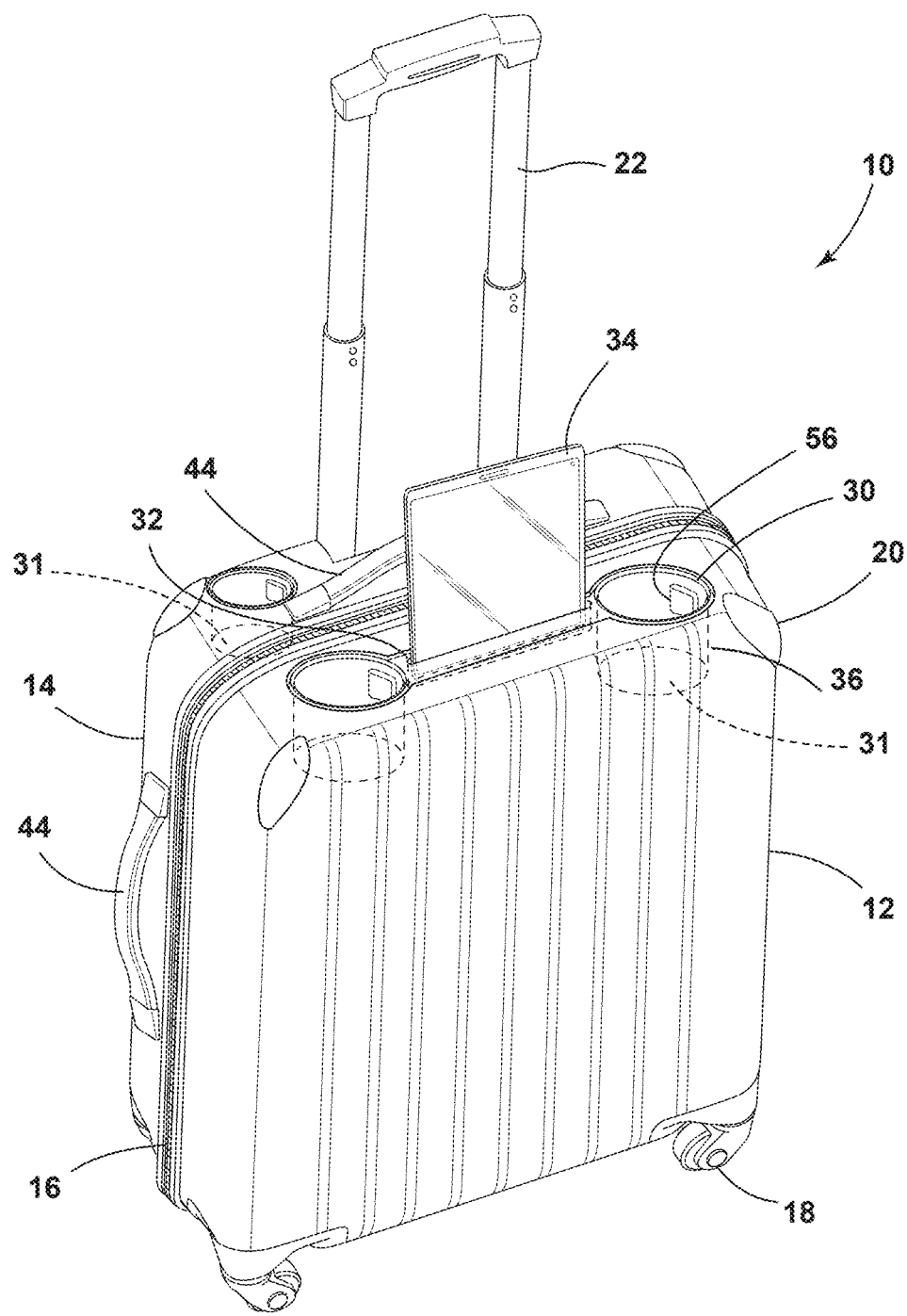
FIG. 1 is a perspective view of an embodiment of the present disclosure.
Figure 2:
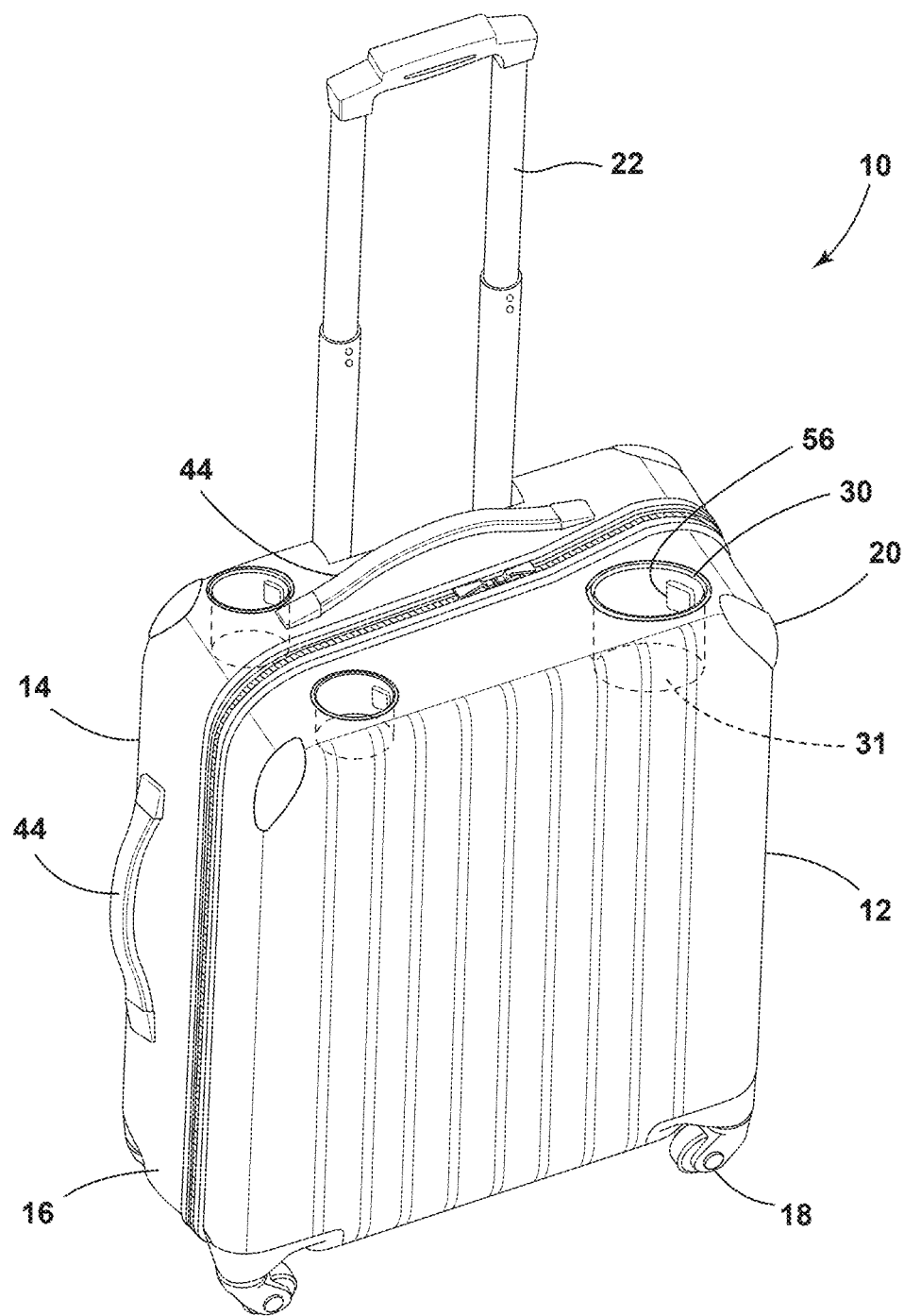
FIG. 2 is a perspective view of an embodiment of the present disclosure.
Figure 3:
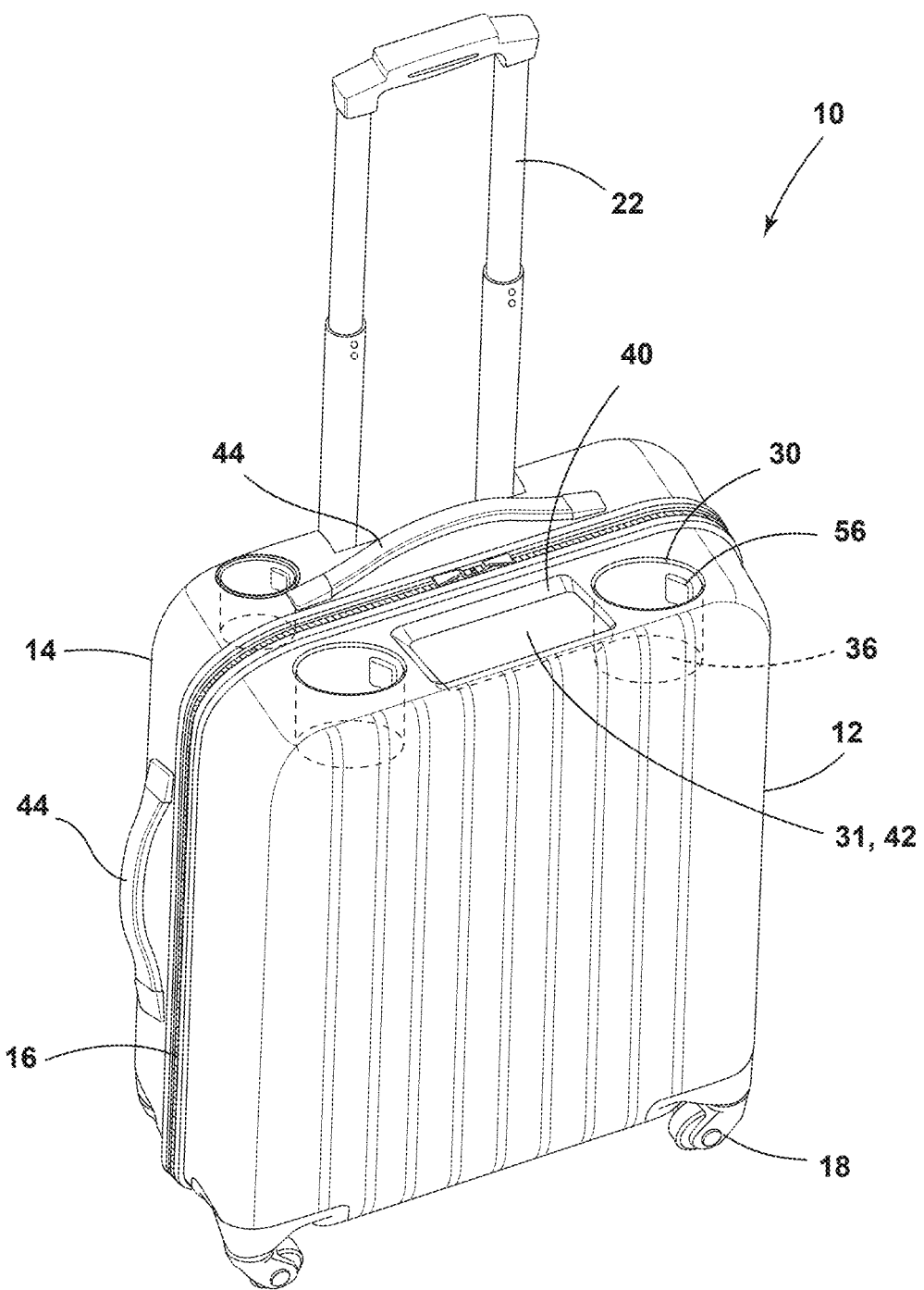
FIG. 3 is a perspective view of an embodiment of the present disclosure.
Figure 4:
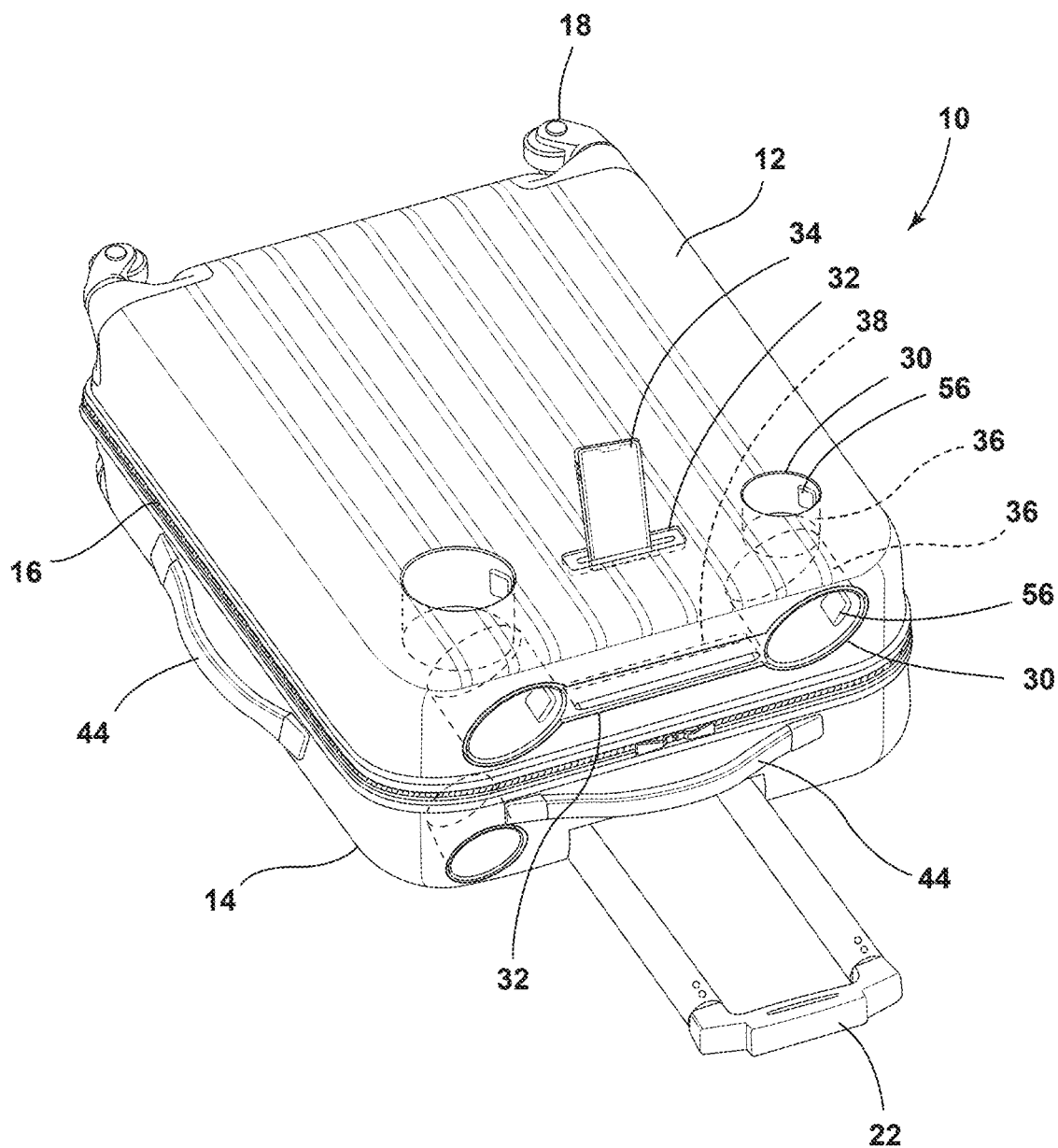
FIG. 4 is a perspective view of an embodiment of the present disclosure.
Figure 5:
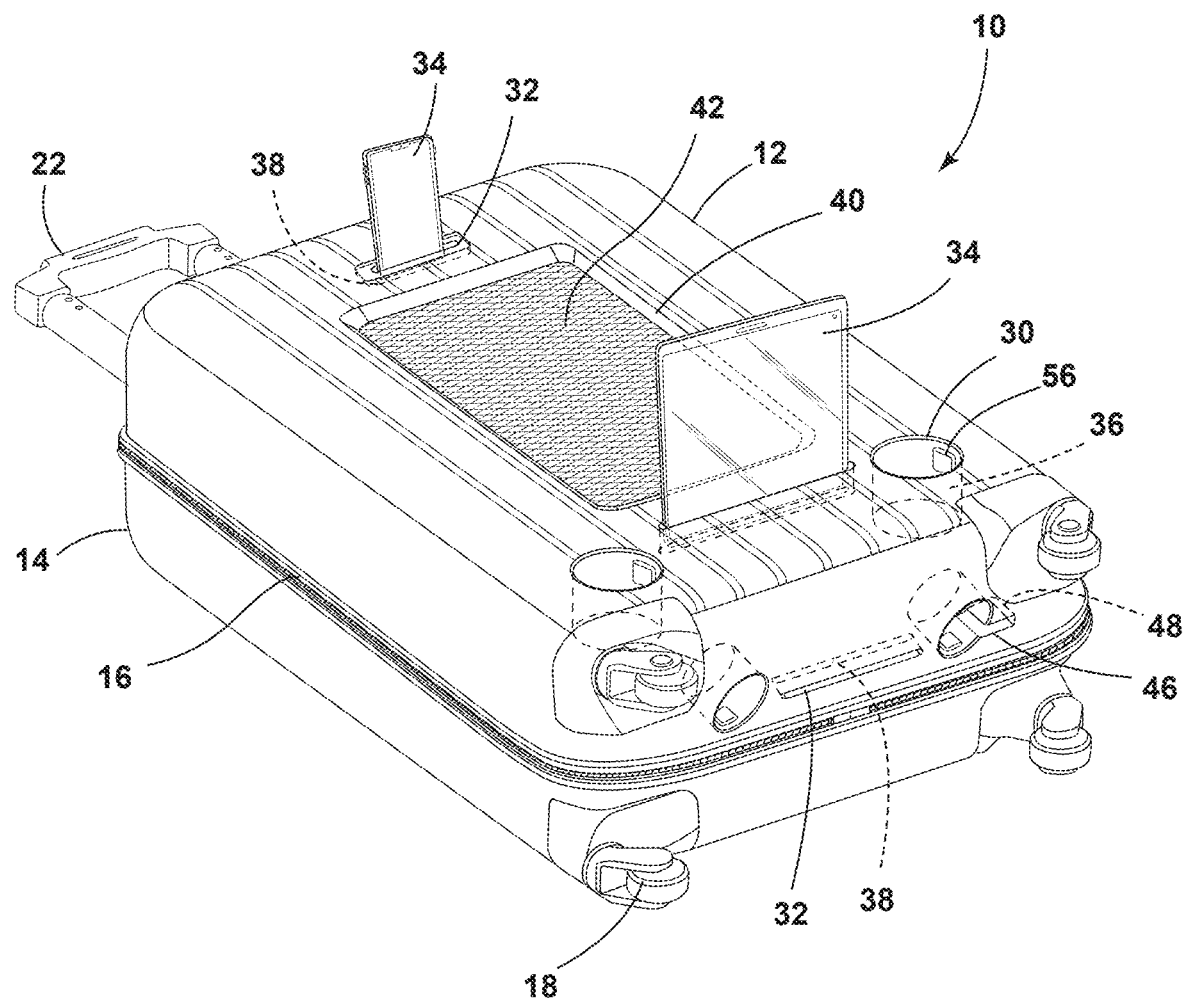
FIG. 5 is a perspective view of an embodiment of the present disclosure.
Figure 6:
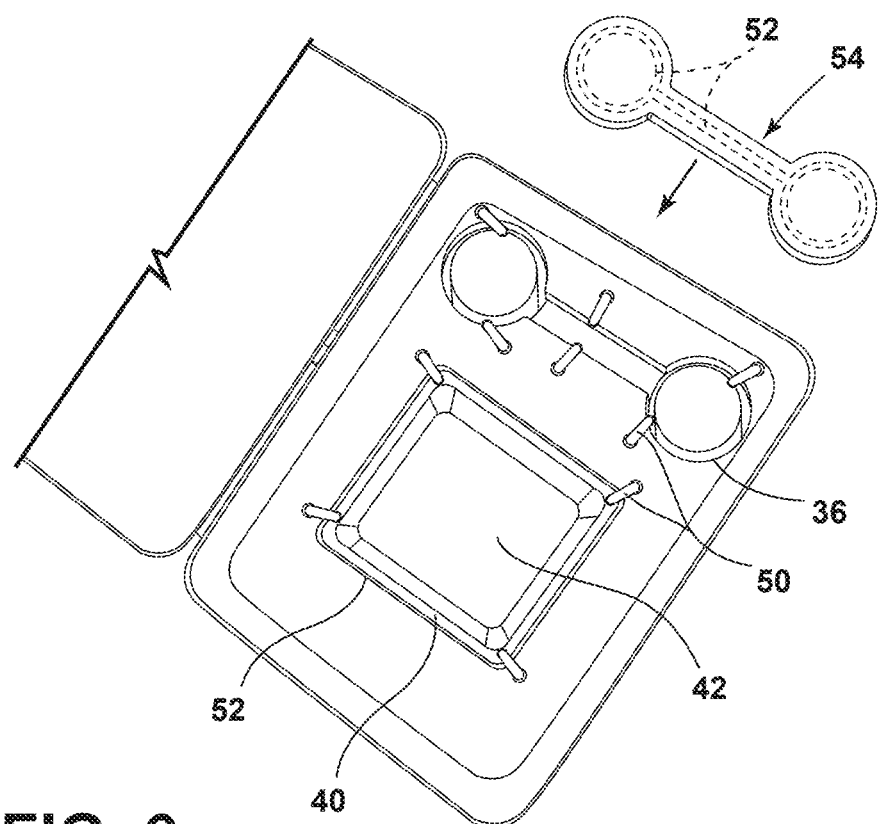
FIG. 6 is a cutaway view of an embodiment of the present disclosure.
Figure 7:
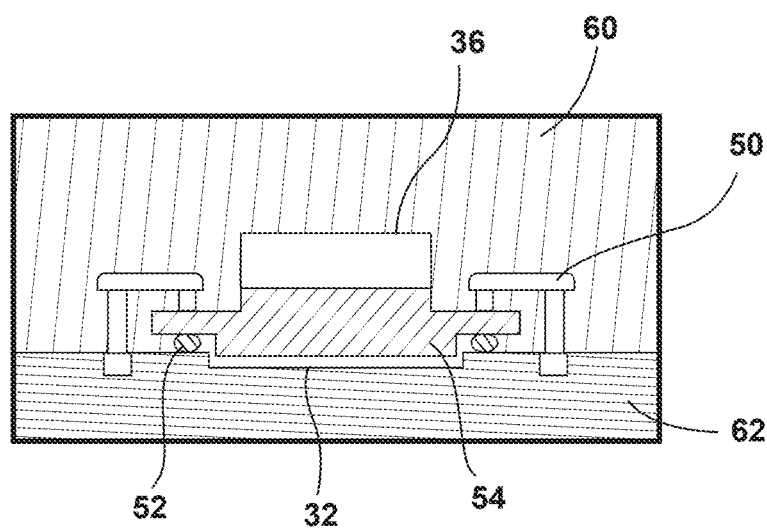
FIG. 7 is a cutaway view of an embodiment of the present disclosure.

As embodied and broadly described herein in the Figures, the present disclosure is directed to luggage 10. It should be understood that the term luggage includes any and all cargo storage capable products, particularly but not exclusively used for travel or business. For example, and without limitation, luggage may also apply to other types of cargo storage capable products, including briefcases, bookbags, totes, sacks, shipping containers, and computer bags.

According to one embodiment of the disclosure, luggage 10 may be in the form of a roller-style piece of luggage, such as those typically referred to as "carry-ons" used for air and train travel as well as a larger roller-style piece of luggage, such as those typically transferred to the air carrier or train baggage handler, typically referred to as "checked bags".

Luggage 10 may include a front portion 12 and a rear portion 14. It should be understood that the terms "front" and "rear" may also be referred to as "top" and "bottom" and the terms may be used interchangeably herein. Front portion 12 and/or rear portion 14 may be constructed of one or more materials, including but not limited to polymers, plastics, or composite materials. Front portion 12 and/or rear portion 14 may include one or more components, such as a joint 16.

It is contemplated that luggage 10 may include more than 2 portions (e.g., front portion 12 and rear portion 14) linked by joint 16, or may include a single portion without joint 16. In embodiments with a single portion, joint 16 may be configured as a selectable opening (e.g., a bag, a pouch, or a sack). The selectable opening may allow limited access to the interior of the single portion of luggage 10.

In other embodiments, joint 16 may be of a type that allows for the front portion 12 to be separated or selectable separated from the rear portion 14, at least partially. For example, joint 16 may be in the form a zipper, or other selectably moveable device, allowing front portion 12 to be separated or opened, at least partially, relative to rear portion 14. In some embodiments, front portion 12 may remain permanently connected to rear portion 14. In other embodiments, front portion 12 may be selectively detachable and/or re-attachable from/to rear portion 14. In other embodiments, other devices or a combination thereof are contemplated, including but not limited to, clasps, snaps, locking mechanisms, and hook-and-loop fasteners.

Luggage 10 may include one or more wheels 18. Wheels 18 may be located at various locations about luggage 10, such as on the edges of front portion 12 and/or rear portion 14. Wheels 18 may be detachable and/or removable from luggage 10. Wheels 18 may include motors or other propulsive mechanisms and/or devices. Luggage 10 may include power supplies for at least wheels 18. The power supplies may include storage batteries and/or solar panels, for example. The power supplies may also provide power to other components, sections, or portions of luggage 10. For example, luggage 10 may include wired or wireless charging components and/or systems. In embodiments, the power supplies may be at least one of a battery, a solar panel, a fuel cell, and a connection to a power grid.

Bumpers 20 may be located about the outer surfaces of front portion 12 and/or rear portion 14. Bumpers 20 may provide additional protection from impact on luggage 10, such as from falling over, sliding, or handling in transportation systems such as airline or rail baggage handling systems. Bumpers 20 may be replaceable or interchangeable. Bumpers 20 may be configurable for different applications and uses of luggage 10.

Luggage 10 may include one or more retractable/extendible handles 22. In embodiments, retractable handle 22 may include one or more sections which may be enclosed within one another (i.e., a collapsible configuration) for storage within the enclosed space of luggage 10. Luggage 10 may include one or more grab handles 44.

Luggage 10 may include at least one cupholder 30. Cupholder 30 may be disposed on various surfaces of front portion 12 and/or rear portion 14. Cupholder 30 may be sized to accept various containers, including but not limited to beverage and food containers. Cupholder 30 may extend at least partially into the enclosed space of luggage 10 in either front portion 12 and/or rear portion 14 via cupholder recessed portions 36. Cupholder 30 may also include frictional elements such as grips 56 to provide additional security and/or stability in selectively restraining a container within cupholder 30.

In embodiments, cupholder 30 may include movable elements (not shown) that may selectively move to engage containers of various sizes. These movable elements may be spring loaded, for example, or be configured with flexible elements or a combination thereof to deflect against movement of containers inserted and/or removed from cupholder 30. Cupholder 30 may include frictional elements and/or movable elements about the perimeter and/or edge of cupholder 30. Cupholder 30 may include frictional elements at least partially on one or more surfaces of cupholder 30.

In embodiments, cupholder 30 and/or cupholder recessed portion 36 may include charging devices 31. Charging devices 31 may include one or more wired charging ports and/or wireless charging coils, control units, and power supplies. The wireless charging coils may be incorporated (i.e., embedded) within luggage 10 and/or cupholder 30. The wireless charging coils may include removeable and/or rechargeable power supplies, such as batteries and/or solar panels. Wires may connect some or all of the components of the charging devices 31.

In embodiments, one or more slots 32 may be disposed on one or more surfaces of luggage 10. In embodiments, slot 32 may be adjacent to one or more cupholders 30. Slot 32 may extend to and/or into one or more cupholders 30, interrupting the perimeter of cupholder 30.

Slot 32 may be configured to accept one or more mobile devices 34. Mobile devices 34 may include, for example, mobile phones and/or tablet computers. Other objects may be stored in slot 32. For example, magazines, books, and cards may be stored within slot 32. Slot 32 may extend at least partially below the exterior surfaces of luggage 10, including but not limited to front portion 12 and/or rear portion 14 via a slot recessed portion 38. Slot recessed portion 38 may include charging elements 31 that may utilize wired and/or wireless charging components to charge mobile devices 34.

Slot 32 may include one or more frictional elements to secure mobile device 34 in a desired position to allow the display (i.e., screen) of the mobile device 34 to be viewed. It should be understood that cupholders 30 and/or slots 32 may be combined into a group or module, or be separate elements.

Luggage 10 may also include at least one tray 40. In embodiments, tray 40 may be located on front portion 12 and/or rear portion 14, or a portion of each, overlapping joint 16. Tray 40 may be shaped to receive a variety of objects, such as food items, beverage containers, or other articles.

Tray 40 may also include a sunken portion 42 that extends below the exterior surface or into the interior of luggage 10, including front portion 12 and/or rear portion 14. Tray 40 and/or tray sunken portion 42 may include and/incorporate frictional elements, such as a rubberized or high-friction surface, to prevent objects from moving after placement in the tray 40 and/or tray sunken portion 42. In embodiments, tray 40 and/or tray sunken portion 42 may include charging devices 31. The inductive charging devices 31 may include removable and/or rechargeable power supplies, such as batteries. In embodiments, tray 40 and/or tray sunken portion 42 may incorporate one or more cupholders 30 and/or slots 32.

In embodiments, luggage 10, including but not limited to front portion 12 and/or rear portion 14 may include one or more cupholders 30 and/or slots 32 (with or without their respective recessed portions). In embodiments, the cupholders 30 and/or slots 32 may be located in close proximity to each other on front portion 12 and rear portion 14.

In embodiments, luggage 10 may include one or more cupholders 30 (with or without their respective recessed portions) and at least one notch 46. Notch 46 may be positioned to receive a handle of a beverage container, such as a thermal (i.e., insulated) beverage mug. Notch 46 may also include a notch recessed portion 48 extending from the exterior surface 62 of luggage 10 and notch 46 into the interior 60 of luggage 10. In embodiments, notch 46 may be disposed to incorporate slot 32.

In embodiments, luggage 10 may include at least one latch 50. Latch 50 may be disposed on front portion 12 and/or rear portion 14. For example, latch 50 may be riveted to front portion 12 and/or rear portion 14. Latch 50 may be configured to selectively engage cupholder 30, including cupholder recessed portion 36, slot 32 and slot recessed portion 38, and/or blank plug 54. Latch 50 allows for the selective removal and/or replacement of cupholder 30, including cupholder recessed portion 36, slot 32 and slot recessed portion 38, and/or blank plug 54.

In embodiments, latch 50 may operate on the interior 60 of luggage 10, including the interior 60 of front portion 12 and/or rear portion 14. Latch 50 may engage a flange surface extending from cupholder 30, slot 32, and/or blank plug 54. For example, a plurality of latches 50 may be disposed about the perimeter of the opening in luggage 10 to receive cupholder 30, slot 32, and/or blank plug 54. Engaging the latches 50 with the cupholder 30, slot 32, and/or blank plug 54 may compress one or more seals 52 of cupholder 30, slot 32, and/or plug 54. Latches 50 and/or seals 52 provide a secure boundary of luggage 10, preventing water, dirt, or other debris from entering the interior 60 of luggage 10. Additionally, latches 50 and/or seals 52 also maintain the structural rigidity and security of luggage 10.

Grips 56 may be included with one or more cupholder 30. Grips 56 may assist in retaining or selectively holding objects placed within cupholders 30, such as a bottle. Grips 56 may be formed of a material or materials that include high-friction elements, such as rubber or a synthetic version of rubber or a rubber-like material. Grips 56 may also include mechanical elements such as spring-loaded and/or retractable members to selectively engage objects placed within cupholders 30.

In embodiments, cupholders 30 (and/or cupholder recessed portion 36), slots 32 (and/or slot recessed portion 38), and tray 40 (and/or tray sunken portion 42) (collectively "components") may be affixed and/or integrated in luggage 10, including but not limited to front portion 12 and/or rear portion 14. For example, integration may include molding and/or machining one or more of the components into luggage 10. It is also anticipated that a first portion of the components may be molded or otherwise incorporated into luggage 10 and a second portion of the components may be configurable and/or removable into luggage 10. In other embodiments, integration may occur after luggage 10 is initially manufactured (i.e., retro-fitted), or a combination thereof.

The preceding examples illustrate embodiments of the disclosure, but should not be viewed as limiting the scope of the disclosure.

Other embodiments and uses of the disclosure will be apparent to those skilled in the art from consideration of the specification and practice of the disclosure disclosed herein. All references cited herein, including all publications, U.S. and foreign patents and patent applications, are specifically and entirely incorporated by reference. The term comprising, where ever used, is intended to include the terms consisting and consisting essentially of. Furthermore, the terms comprising, including, and containing are not intended to be limiting. It is intended that the specification and examples be considered exemplary only with the true scope and spirit of the disclosure indicated by the following claims.

The invention claimed is:

1. An article of luggage comprising:
   a rear portion of the article of luggage, the rear portion defining a first interior surface and a first exterior surface,
   a front portion of the article of luggage, the front portion defining a second interior surface and a second exterior surface, wherein the front portion couples to the rear portion to define a volume;
   wherein the rear portion includes at least one of a handle or a cupholder, wherein the cupholder includes a circular opening on the first exterior surface of the rear portion; and the front portion includes at least one cupholder, wherein the cupholder includes a circular opening on the second exterior surface of the front portion further comprising a selectively removable plug to replace a selectively removable cupholder, wherein the plug selectively engages at least one latch of the article of luggage and including a seal to engage at least one of the first or the second exterior surfaces of the article of luggage.

2. An article of luggage comprising:
   a rear portion of the article of luggage, the rear portion defining a first interior surface and a first exterior surface,
   a front portion, the front portion defining a second interior surface and a second exterior surface, wherein the front portion is selectively attached by a selectably openable joint to the first rear portion to define a volume;
   wherein the rear portion includes at least one of a handle and a cupholder, wherein the cupholder includes at least one circular opening on the first exterior surface of the rear portion extending into the volume;
   wherein the front portion includes at least one cupholder, wherein the cupholder includes at least one circular opening on the second exterior surface of the front portion extending into the volume further comprising a selectively removable plug to replace a selectively removable cupholder, wherein the plug selectively engages at least one latch of the article of luggage and includes a seal.

3. An article of luggage comprising:
   a rear portion, the rear portion defining a first interior surface and a first exterior surface,
   a front portion, the front portion defining a second interior surface and a second exterior surface, wherein the front portion is selectively attached by a selectably openable joint to the rear portion to define a volume;
   wherein the rear portion includes a wheel and a handle;
   wherein the front portion includes a wheel, a cupholder, and a slot;
   wherein the cupholder includes an annular opening adjacent to the second exterior surface of the front portion further comprising a selectively removable plug to replace a cupholder, the plug selectively engages at least one latch of the article of luggage and including a seal to engage at least one of the first or the second exterior surfaces of the article of luggage.

* * * * *